July 12, 1927.  
M. P. FISHBURN  
1,635,746  
RAIN GUARD FOR AUTOMOBILE HOODS  
Filed Dec. 4, 1924  
3 Sheets-Sheet 1
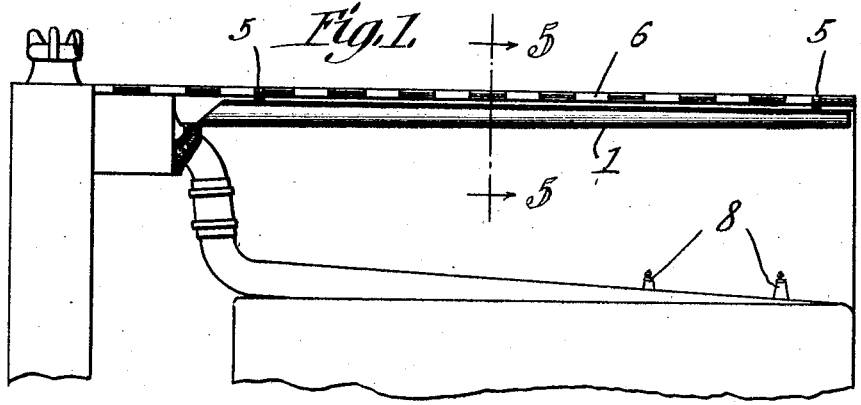
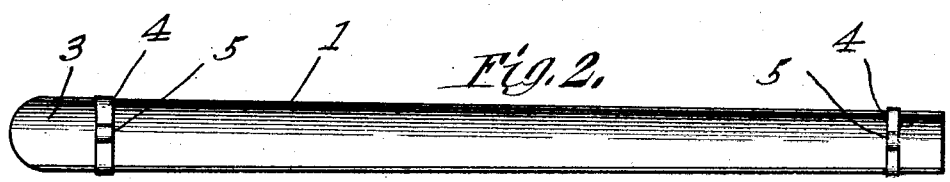
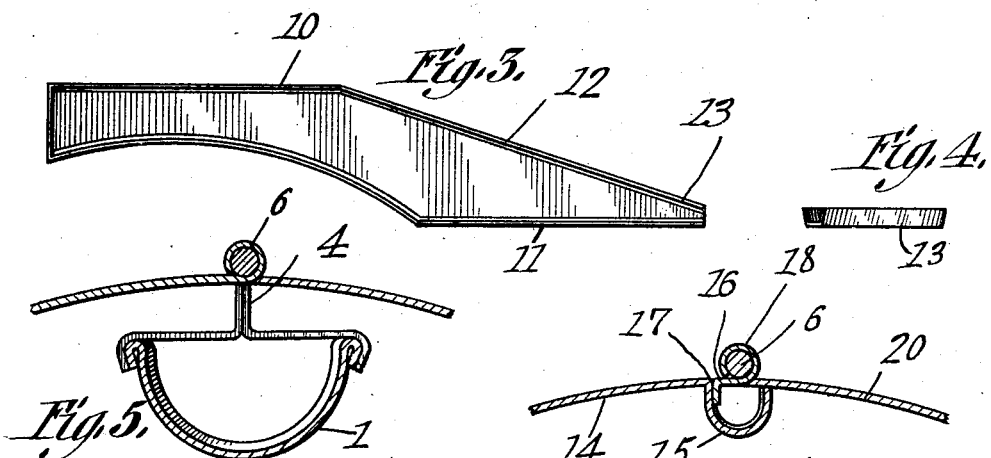
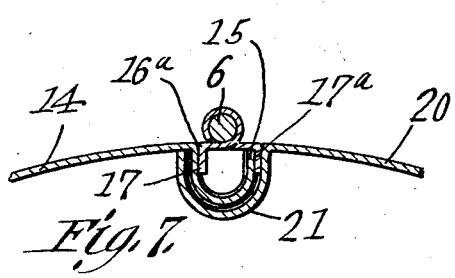
Inventor  
M. P. Fishburn  
By C. A. Snow & Co  
Attorney July 12, 1927.
M. P. FISHBURN
1,635,746
RAIN GUARD FOR AUTOMOBILE HOODS
Filed Dec. 4, 1924
3 Sheets-Sheet 2
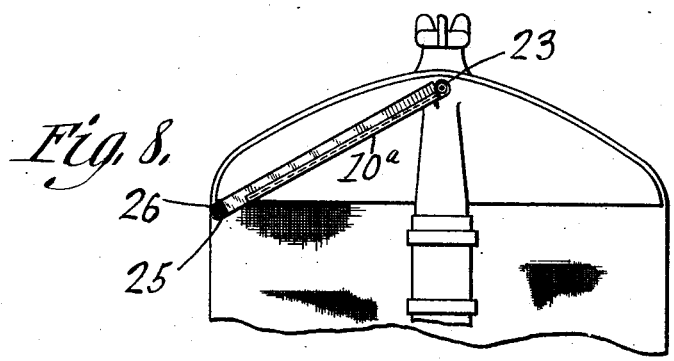
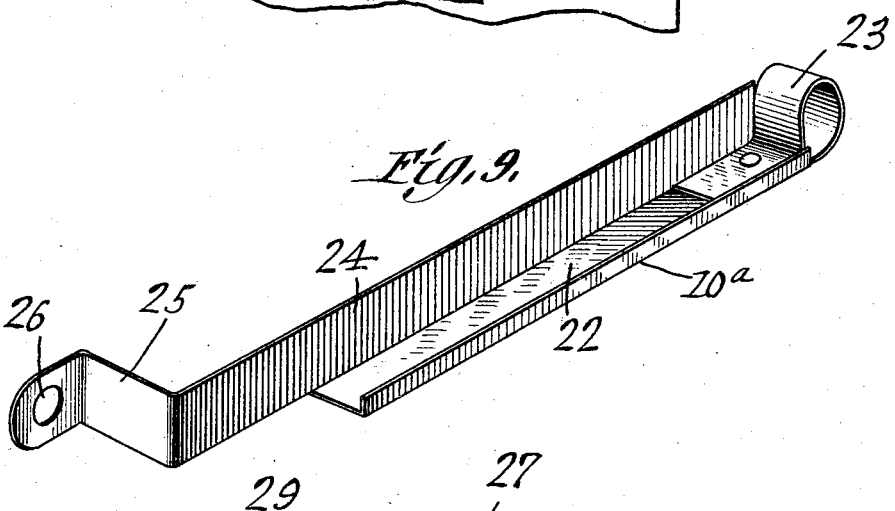
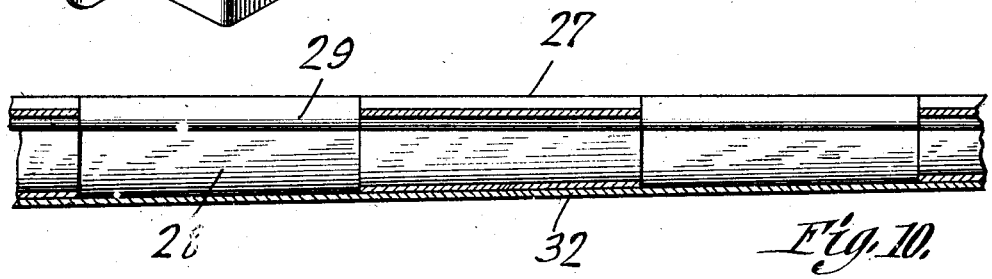
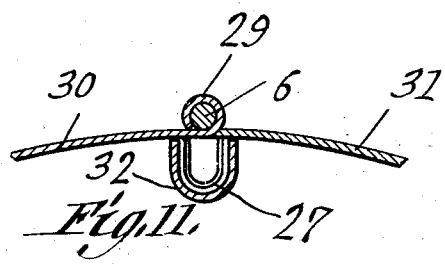

July 12, 1927.
M. P. FISHBURN
1,635,746
RAIN GUARD FOR AUTOMOBILE HOODS
Filed Dec. 4, 1924
3 Sheets-Sheet 3
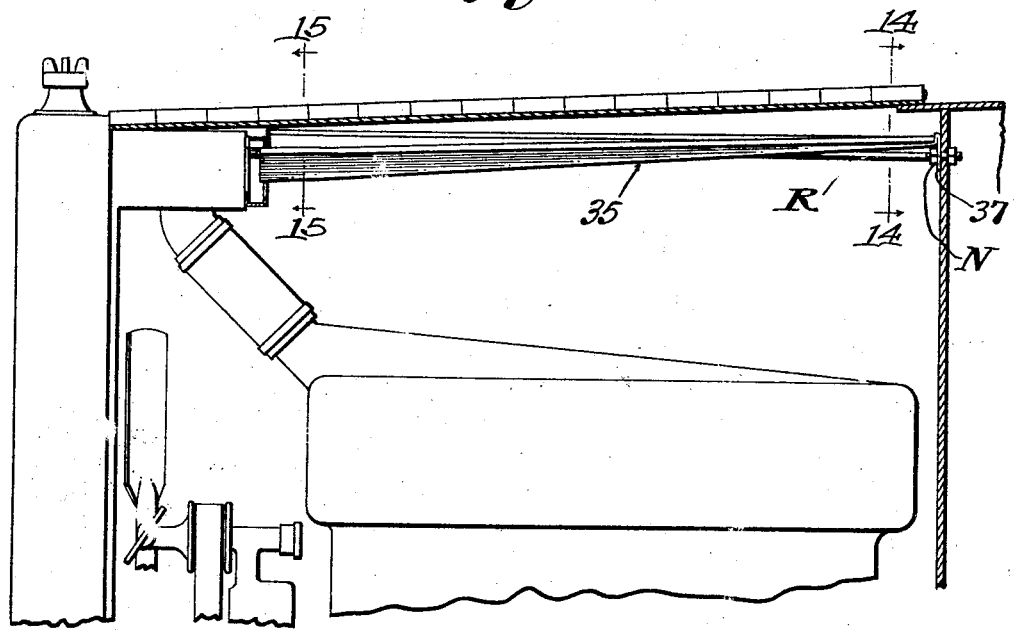
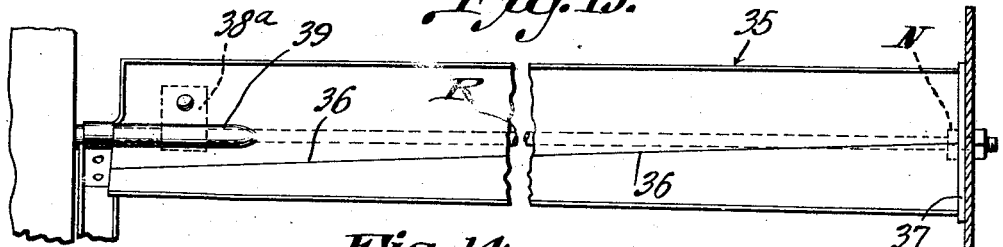
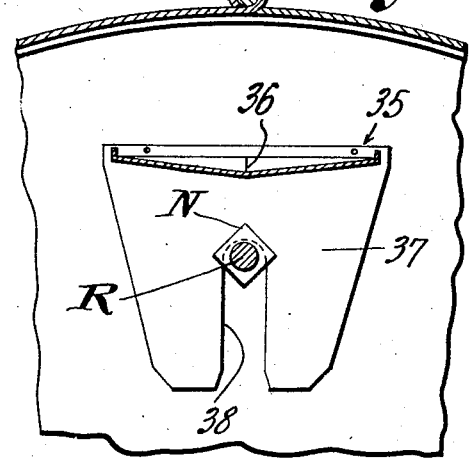
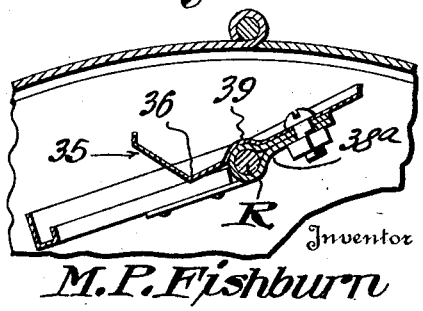
Inventor
M. P. Fishburn
By C. A. Snow & Co.
Attorneys Patented July 12, 1927.

1,635,746

UNITED STATES PATENT OFFICE.

MOSES P. FISHBURN, OF CARTHAGE, MISSOURI.

RAIN GUARD FOR AUTOMOBILE HOODS.

Application filed December 4, 1924. Serial No. 753,967.

This invention relates to a guard for protecting the ignition system within the hood of an automobile from water leaking through joints in the hood.

The object of the invention is to provide a cheap and efficient attachment of this character which will effectually catch all leakage from both the center joint of the hood and from around the connection of the hood and the dash and radiator ends.

Another object of the invention is to provide a guard of this character constructed so that it will remain in proper position and set close enough to the hood to effectually catch all leakage and prevent it from flowing over onto the wires to be protected.

Another object is to construct a guard of this character so that either or both sides of the hood cover may be lifted without moving the position of the drain trough permitting the drain trough to remain always in proper position to catch the leakage.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section of an automobile engine hood with this improved guard shown in side elevation and in operative position therein;

Fig. 2 is a top plan view, one form of center joint projecting trough;

Fig. 3 is a similar view of the trough which connects the leakage from the center through and discharges it at the side of the engine;

Fig. 4 is a detailed perspective view;

Fig. 5 is a transverse section taken on the line 5—5 of Fig. 1;

Fig. 6 is a similar view showing a slightly different form of the invention;

Fig. 7 is a view similar to Fig. 6.

Fig. 8 is a transverse section showing a different form of trough for conducting the drip water from the center through to the side of the car;

Fig. 9 is a perspective view of this trough detached;

Fig. 10 is a longitudinal section showing still another form of the invention;

Fig. 11 is a transverse section thereof;

Fig. 12 is a longitudinal section through a Ford car hood showing a different form of trough;

Fig. 13 is a top plan view of the trough detached;

Fig. 14 is a transverse section taken on line 14—14 of Fig. 12; and

Fig. 15 is a similar view taken on the line 15—15 of Fig. 12.

Engine hoods for automobiles and particularly those used in Ford cars, are formed of hinged sections and the point at which these sections are hinged is generally at the top of the hood so that during stormy weather, rain percolates through the openings at the hinged joints and drops onto the spark plugs. This results in destruction of the insulation and short circuiting of the plugs. In many forms of automobiles an opening is provided at the juncture of the cowl and the hood through which the water passes falling onto the conducting wires which extend from the coil box destroying the insulation and interfering with the ignition system of the car. It is to overcome these objectionable features that this invention is designed.

In the embodiment illustrated in Figs. 1 to 5 a trough 1 is arranged above the spark plugs S so as to catch the water which leaks through the joints between the hood sections and conduct this water away to prevent it from contact with the conducting wires. This trough 1 preferably increases in depth and width from its inner end 2 toward the radiator or outer end 3 and discharges at the end 3 into a transversely arranged trough 10.

Brackets or hangers 4 are arranged at longitudinally spaced intervals on the trough 1 preferably at the ends thereof and span the space between the edges of the trough. These hangers are provided with loops 5 through which the rod 6 which connects the hood sections is designed to pass and by means of which the trough is supported below the hinged connection of the sections in position so that it will not interfere with opening of either section yet will be sufficiently close to catch the drip water leaking through the joints.

The trough 10 which extends transversely of the hood at the radiator end thereof is shaped as shown in Fig. 3 to adapt it to be attached along its straight edge 11 to the radiator by bolting or soldering. This trough 10 has an upstanding flange 12 along its edges and tapers toward its discharge end 13. This end is positioned so as to discharge the water conducted into it from trough 1 into the grease pan of the automobile where it will not come in contact with any ignition wires.

In Fig. 6 the hood section 14 has its hinge connected edge bent downwardly and shaped to form a trough 15 which is designed to lie under the center rod 6 which connects the two hood sections and said trough is so proportioned so as to catch all leakage of the joints between the sections and is adapted to conduct it and discharge it into the trough 10 shown in the other figures. To connect the hood section 14 with the center rod 6 a strip of metal 16 is welded or otherwise secured to the trough 15 at its inner upper edge and which is provided with knuckles or bearings 18 to receive rod 6. As shown the strip 16 has a right-angular flanged 17 which is designed for attaching it to the trough. The seam which connects the strip 16 with the hood section 14 being located in such close proximity to the hinged connection of the two sections is not noticeable.

This rain guard may also be made double as shown in Fig. 7 that is each of the hood sections 14 and 20 may be provided along their meeting edges with troughs 15 and 21 which are located one within the other to permit the free turning of the hood sections in opening and closing thereof. The strip 16ª similar to strip 16 except that it is provided with two flanges 17 and 17ª one of which is soldered or secured otherwise to trough 15 while flange 17ª is soldered to trough 21.

In the form shown in Figs. 8 and 9 the transversely arranged trough 10ª is made straight with the bottom 22 thereof extended longitudinally and said extension bent rearwardly to form a loop 23 adapted to extend over the shoulder attached to the back side of the radiator to receive the connecting rod reaching from the radiator to the dash 2. The other end of the trough has the upright side 24 thereof extended as shown at 25 and which is apertured as shown at 26, said extended end being designed to be bent and bolted to the radiator thus avoiding the necessity of soldering the trough to the radiator. This trough 10ª may be of a width and length regulated according to the make of car in connection with which it is to be used.

In the form shown in Figs. 10 and 11 the trough 27 which is designed to be located under the hinged connection of the hood sections 30 and 31, is formed by bending the inner edge of section 30 to form the trough 27. Struck out from the trough 27 are tongues 28 which are rolled to form bearings 29 to receive the hinged pintles 6. This striking out of the tongues leaves openings in the trough which are closed by soldering or otherwise securing a metal strip 32 around the outer or inner face of the trough. By so constructing the trough a fourth part of the hood cover may be made in one solid piece of material including the trough.

In the form shown in Figs. 12 to 15 the trough 35 is constructed of a sheet of rust proof metal of suitable length and is bent longitudinally at one side of its median longitudinal line as shown at 36 and has one end bent downwardly at right angles to form an attaching finger or plate 37. This plate 37 has an open longitudinal slot 38 at its free end which is designed to fit over the brace rod R which connects the dash and radiator of a Ford car, between the lock nut N and the dash, the nut serving to clamp the trough to the dash.

A clip 38ª is carried by the lower face of the trough 35 near its front end and is designed to clamp said end to rod R as shown in Fig. 15.

This construction of the trough 35 with one side higher than the other insures the catching of the drip water and directs it to the transverse discharge trough. The right angular finger 37 which straddles rod R in connection with the clip 38 which lies close to the face of the trough operate to hold the trough 35 at an incline tilting downward from the rear toward the front of the engine hood.

The front end of trough 35 has a longitudinal groove 39 formed in its lower face to form a seat to fit over the rod R.

This form of trough is very simple and can be easily and quickly attached to a Ford car without changing the construction in any way.

I claim:—

A rain guard for automobile hoods including a body portion embodying a trough having a loop at one end, said loop adapted to accommodate the rod of an automobile hood, said trough having an apertured flange at its opposite end for connection with the radiator disposed adjacent to the forward end of the hood, said trough being constructed from a single sheet of metal with the bottom extended at one end to form the loop and its side extended at the other end to form the attaching flange.

In testimony that I claim the foregoing as my own, I have hereto affixed my signature.

MOSES P. FISHBURN.